July 30, 1935.  J. L. SHEA  2,009,718
ROD LINE COUPLING
Filed Feb. 14, 1934

Jerry L. Shea
INVENTOR

BY R. J. Dearborn
HIS ATTORNEY

Patented July 30, 1935

2,009,718

UNITED STATES PATENT OFFIC 2,009,718

ROD LINE COUPLING

Jerry L. Shea, Shreveport, La., assignor to The Texas Company, New York, N. Y., a corporation of Delaware Application February 14, 1934, Serial No. 711,185

7 Claims. (Cl. 74—593)

This invention relates to a rod line coupling device, and particularly to such a device adapted for connecting and disconnecting the pumping line of a well with a power source, and for pulling up the pumping line to make such connection.

In pumping oil wells, it is customary to operate the pumps of a number of wells from a single power source. The individual wells are usually connected by so-called rod lines with the power source, each rod line being reciprocated to operate the pumping unit of its respective well. It is frequently desirable to terminate the pumping at one or more wells, without disturbing the operation of the others. This is accomplished by unhooking the rod line in a convenient place, preferably located near the central power source. This necessitates breaking the driving connection in the rod line, while the power driven reciprocating member continues its movement. Devices heretofore used for this purpose have been dangerous to operate, and operators have often suffered crushed hands or fingers or other injuries.

It has heretofore been proposed to employ a device for disconnecting the rod line by the simple manipulation of a lever or the like, so as to increase the safety of the manipulation. However, such devices have generally consisted of interfitting relatively slideable parts, resulting in complicated and expensive constructions, and necessitating accurate machining of the interfitting parts. Such devices are also subject to rapid wear, and require frequent adjustment or replacement.

It is an object of the present invention to provide a device for safely disconnecting and connecting a rod line, which is simple in construction, economical to manufacture, easy to install and operate in the field, and which has comparatively long life.

When a rod line breaks, the pumping valve in the well falls to its full extent. When this occurs, the rod line is unhooked from the power driven reciprocating member, and the line repaired. It it then necessary to pull up the rod line and pumping valve for reconnection to the power source. Various constructions have been employed for this purpose, such as various types of jacks, pull-up hooks and the like. These and other methods commonly used are dangerous, and operators are often injured.

It has heretofore been proposed to employ a pick-up device which is inserted in the line for the purpose of pulling up the pumping line to the extent required to make the connection, the pull-up device being thereafter removed. Such devices have usually consisted of interfitting relatively slideable parts of the character of a ratchet bar and a carriage traveling thereon carrying a pawl. Such devices are complicated, expensive, subject to rapid wear, and are heavy and difficult to manipulate.

Another object of the present invention is to provide a pull-up device of this character which is simple and inepensive in construction, safe and easy to operate, and which has long life.

Other objects and advantages of the invention will be apparent from the following description, the accompanying drawing and appended claims.

In the drawing, in which like characters of reference designate like parts throughout the several views thereof;—

Figure 1:
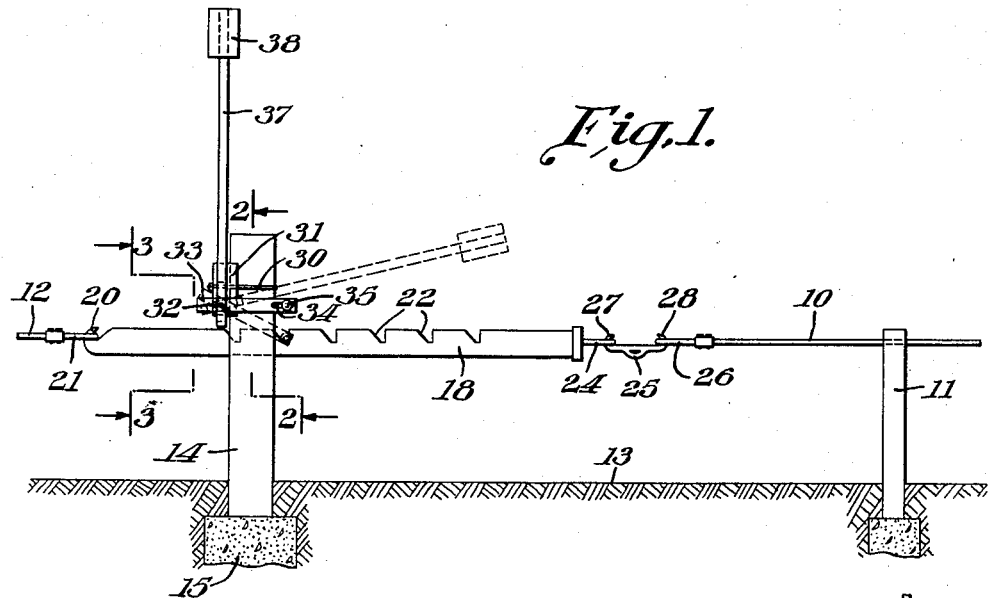
Fig. 1 is a side elevational view of the rod line coupling device of the present invention.
Figures 2, 3:
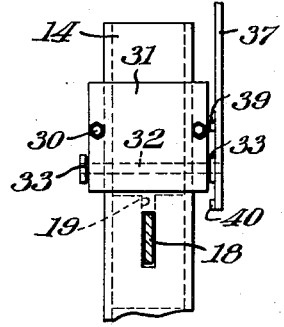
Fig. 2 is a vertical sectional view through the knock-off post and related parts, taken on the plane of the line 2—2 of Fig. 1.
Fig. 3 is a vertical sectional view taken on the plane of the line 3—3 of Fig. 1.

Referring to the drawing, in which is illustrated a preferred embodiment of the invention, 10 indicates the power driven reciprocating member, shown as slideably mounted in post 11, and which is connected to the power source so that it constantly reciprocates during operation of the power source. 12 indicates the rod line which leads to the pumping unit of the well. As shown, this is a surface rod line, the ground level being indicated at 13. Mounted in the plane of the movement of the pumping line, and preferably adjacent to the power source, is a knock-off post 14, which is embedded in concrete 15 within the ground. The post may be formed of hollow pipe, within which is inserted a wooden plug 16 having socket 17 for guiding a notched or toothed bar 18 in its reciprocating movements, the post having oppositely disposed slots 19 for the reception of the bar. Bar 18 is connected by hook 20 with an eye 21 in the end of the pumping line 12. The bar 18 is provided with a plurality of upwardly facing notches or ratchet teeth 22.

The opposite end of bar 18 is provided with an eye 24, and a gravity releasable coupling member 25 connects eye 24 with eye 26 in the end of the power driven reciprocating member 10. Coupling 25 is constructed with upwardly facing oppositely disposed hooks 27 and 28, which are inserted from beneath within the eyes 24 and 26 respectively. The hooks are of such slight curvature that the coupling 25 readily falls out of the line by gravity, when any slack occurs in the line.

Mounted on post 14 by U-bolt 30 is a block or metal strap 31, which partially surrounds the post to afford substantial contact therewith. Mounted in block 31 is a pivot pin 32 on which are pivotally mounted spaced bars 33, which straddle the post and extend to the opposite side thereof. Aligned horizontally extending slots 34 are formed in the ends of bars 33. Slideably mounted within the slots is a holding pin or rod 35. Also pivoted on pin 32 is a lever 37 carrying a weight 38 at its outer end. The lever is formed with inwardly extending lugs 39 and 40 above and below the plane of the bars 33, and in position to contact with the bars to swing them about the pivot 32 as the lever is swung from its neutral or dead center position shown in full lines in Fig. 1. Swinging of the lever in a clockwise direction forces the bars 33 to swing clockwise about pivot 32 to insert the pin 35 in one of the slots of the bar 18, as shown in dotted lines in Fig. 1. Swinging of lever 37 counter-clockwise to a position on the lefthand side of dead center as shown in Fig. 1, tends to release the holding pin 35.

In operation, assuming that the pumping line of the well is to be disconnected, the operator merely swings lever 37 in a clockwise direction, preferably at a time when the power driven reciprocating member 10 and pumping line are moving towards the right, as shown in Fig. 1. The weight 38 then holds the lever in this position, and the pin 35 is forced into one of the slots 21. Due to the inclination of slots 22, pin 35 allows movement of bar 18 toward the right. As the power driven reciprocating member releases its pull on the pumping line at the end of its stroke toward the right, and starts to move on its return stroke to the left, pin 35 engages in one of the slots 22 and then holds bar 18 and pumping line 12 against movement toward the left. Slack is thereby produced, which causes the coupling member 25 to drop out by gravity to disconnect the line. The normal pull of the pumping line against pin 35 causes this pin to move along slots 34 until the pin contacts with post 14. The post thus takes the strain of the pumping line, and securely holds it in the forward or upper position in which it is locked.

When the pumping line is to be reconnected, the operator merely swings lever 37 counter-clockwise to the other side of dead center position, when the weight 38 holds the lever in this position. This tends to release the locking pin 35, but the pull of the pumping line forcing the pin 35 against post 14 will prevent removal of the pin from its slot under normal actuation. The operator then grasps the coupling 25 at the underside thereof and inserts the hook 26 upwardly through the eye 28 of the bar 18. As the power driven reciprocating member 10 moves in its stroke toward the left to approach the bar 18, the other hook 27 of the coupling 25 is inserted upwardly within the eye 28. Upon reversal of the stroke of member 10, the pull effected by the member 10 through coupling 25 on the bar 18 will release pin 35, so that normal pumping operation is resumed.

In case a rod or link of the pumping line 12 should break during operation, the coupling 25 drops out, and the pumping valve falls in the well to its full extent. The pumping line is repaired by recoupling the rods, which necessitates that the bar 18 be drawn through the post 14 toward the left to take up the gap produced by falling of the line 12. It is then necessary to pull up the pumping line 12 and bar 18 for recoupling to the power driven member 10.

Figure 4:
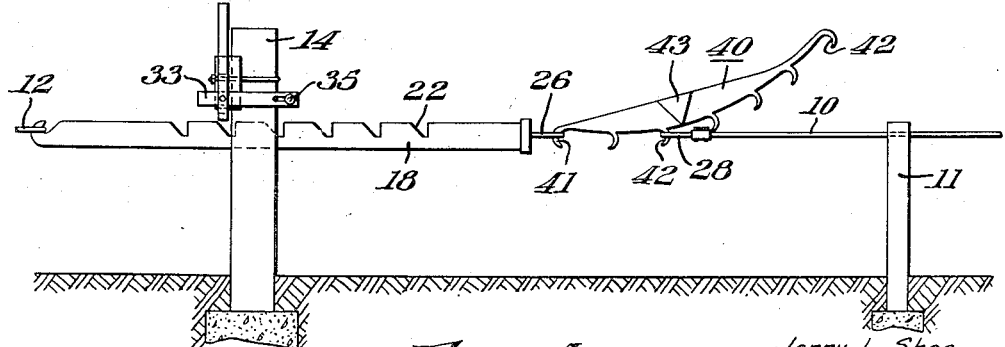
Fig. 4 is a side elevational view of the rod line coupling device, employing the pull-up device of the present invention.

This is accomplished by the pull-up device 40 shown in Fig. 4. This device comprises an elongated bar having a forwardly facing hook 41 which is inserted within the eye 26 of rod 18. The pull-up device is also provided with a plurality of spaced rearwardly facing hooks 42 which are adapted to be engaged successively within the eye 28 of reciprocating member 10. A handle or gripping portion 43 is formed in the central portion at the top of the pull-up device, so that the operator can grasp the same at a protected or safe position.

In operation, for pulling up the line, the lever 37 is rocked clockwise to the holding position, when the weight maintains the lever in that position. The pull-up device 40 is then connected by inserting the hook 41 within the eye 26 of bar 18, which forms a pivot about which the operator may rock or tilt the pull-up device. As the reciprocating member 10 returns on its stroke toward the bar 18, the operator rocks the device 40 downwardly to engage one of the rearwardly facing hooks 42 within the eye 28. On the next forward stroke of the member 10, the whole pumping line, including the bar 18, is moved forwardly to the extent of a notch 22 or multiple thereof. At the end of the forward stroke, the pin 35 drops into the succeeding notch 22, which then holds the pumping line 12 and bar 18 against rearward movement. As the member 10 reverses its stroke, the operator tilts the device 40 upwardly about hook 41 as a pivot to withdraw the previously engaged hook 42 from the eye 28. Adjacent the end of the rearward stroke of member 10, the device 40 is again tilted downwardly to engage another hook 42. Thus, the rearwardly facing hooks 42 are successively engaged, and the bar 18 and pumping line are pulled up on successive forward strokes of the member 10, being held each time against rearward movement. When the line has been pulled up to the extent enabling the coupling member 25 to be inserted the pull-up device 40 is then completely removed, and the coupling 25 inserted in the manner previously described. The line is thus repaired and again put in pumping operation.

Obviously many modifications and variations of the invention, as hereinbefore set forth, may be made without departing from the spirit and scope thereof, and therefore only such limitations should be imposed as are indicated in the appended claims.

I claim:

1. A rod line coupling device adapted for connecting and disconnecting the pumping line of a well with a power driven reciprocating member having a connecting eye therein, a post, a toothed member mounted for reciprocating movement on the post and connected to the pumping line to form a permanent part thereof, the toothed member having a connecting eye at the end thereof adjacent the power driven reciprocating member, a gravity releasable coupling member having upwardly facing hooks adjacent opposite ends thereof, said coupling member being adapted to have the hooks thereof inserted from beneath into the connecting eyes of the power driven reciprocating member and the notched member, and means for holding the notched member and pumping line against movement in one direction of the normal reciprocating movement thereof, whereby, on the following stroke of the power driven reciprocating member toward the notched member, the coupling member drops under the influence of gravity to disconnect the pumping line.

2. In a rod line coupling device for connecting and disconnecting the pumping line of a well with a power driven reciprocating member, a knock-off post having a socket therein, a toothed member forming a part of the pumping line and mounted to reciprocate within the socket of said post, spaced bars pivoted at one side of said post and extending to the opposite side of the post, the bars straddling the post and having horizontally extending slots formed therein at the said opposite side of the post, a pin slidably mounted within said slots at the said opposite side of said post and adapted to engage and release said toothed member, whereby the pull of said pumping line moves the pin when engaged with the toothed member along said slots until the pin contacts with said post, and manually operable means for rocking said bars and pin to engage and release the pin with the said toothed member.

3. In a rod line coupling device for connecting and disconnecting the pumping line of a well with a power driven reciprocating member, a knock-off post having a socket therein, a toothed member forming a part of the pumping line and mounted for reciprocation within said socket, a pivot pin mounted at one side of said post, spaced bars pivotally mounted on said pin and straddling said post, a locking pin mounted in the bars at the opposite side of said post and adapted to engage and release the said toothed member, and a weighted lever also mounted on said pivot pin and having a projection adapted to engage with said bars, the lever being adapted to swing to one side of a dead center position to effect engagement of the locking pin with the toothed member, and to the other side of the dead center position to effect release of the locking pin from the toothed member, whereby the weight of the lever tends to hold it in either of said positions.

4. A rod line coupling device adapted for pulling up the pumping line of a well for connection to a power driven reciprocating member, comprising in combination, a post, a notched member mounted for reciprocating movement on said post and connected to the pumping line to form a permanent part thereof, locking means for holding the notched member and pumping line against movement in one direction of the normal reciprocating movement thereof while allowing movement in the opposite direction, means for engaging and releasing said locking means, and a manually operable pick-up device having a hook adapted to engage with the notched member, and a plurality of spaced hooks facing in the opposite direction from said first-mentioned hook and adapted to be engaged successively with the power driven reciprocating member on successive strokes of the latter, said pick-up device being adapted to be manually rocked about the hook connection with the notched member as a pivot to thereby remove one of the oppositely facing hooks from driving connection with the power driven reciprocating member adjacent one end of the stroke of the latter, and to be manually rocked in the reverse direction to engage another of said oppositely facing hooks with the power driven reciprocating member adjacent the other end of its stroke.

5. For use in pulling up a pumping line to couple it to a power driven reciprocating member, having a post, a notched member connected to the pumping line and mounted for reciprocation on said post, and means for holding said notched member and pumping line against movement in one direction of the normal reciprocating movement thereof while allowing movement in the opposite direction; a pick-up device comprising an elongated member having a hook adjacent one end thereof and facing so as to be engaged with the said notched member, and a plurality of hooks spaced along the length thereof and facing in the opposite direction so as to be engaged in succession with the power driven reciprocating member on successive strokes, said pick-up device also having a handle portion positioned in a protected location whereby an operator can grasp the handle portion and rock the pick-up device about the hook connection with the notched member as a pivot to thereby remove one of the oppositely facing hooks from driving connection with the power driven reciprocating member adjacent one end of the stroke of the latter, and can manually rock the pick-up device in the reverse direction to engage another of the oppositely facing hooks with the power driven reciprocating member adjacent the other end of its stroke.

6. A rod line coupling device adapted for pulling up the pumping line of a well connection to a power driven reciprocating member, comprising in combination, locking means for holding the pumping line against movement in one direction of its normal reciprocating movement while allowing movement in the opposite direction, and a unitary manually operable pull-up device having pivotal connection with said pumping line, and having a plurality of spaced readily releasable connecting hooks adapted to be successively connected and disconnected to the power driven reciprocating member by manual pivotal movement of the pull-up device about its connection with the pumping line as a pivot.

7. A rod line coupling device adapted for pulling up the pumping line of a well for connection to a power driven reciprocating member, comprising in combination, an eye on the end of said power driven reciprocating member, locking means for holding the pump line against movement in one direction of its normal reciprocating movement while allowing movement in the opposite direction, and a single arc-shaped bar adapted to have pivotal connection with the pumping line and having a plurality of spaced hooks projecting from its convex side adapted to be successively connected and disconnected to the eye on the power driven reciprocating member by manual pivotal movement of the bar about its connection with the pumping line as a pivot.

JERRY L. SHEA.